UNITED STATES PATENT OFFICE.

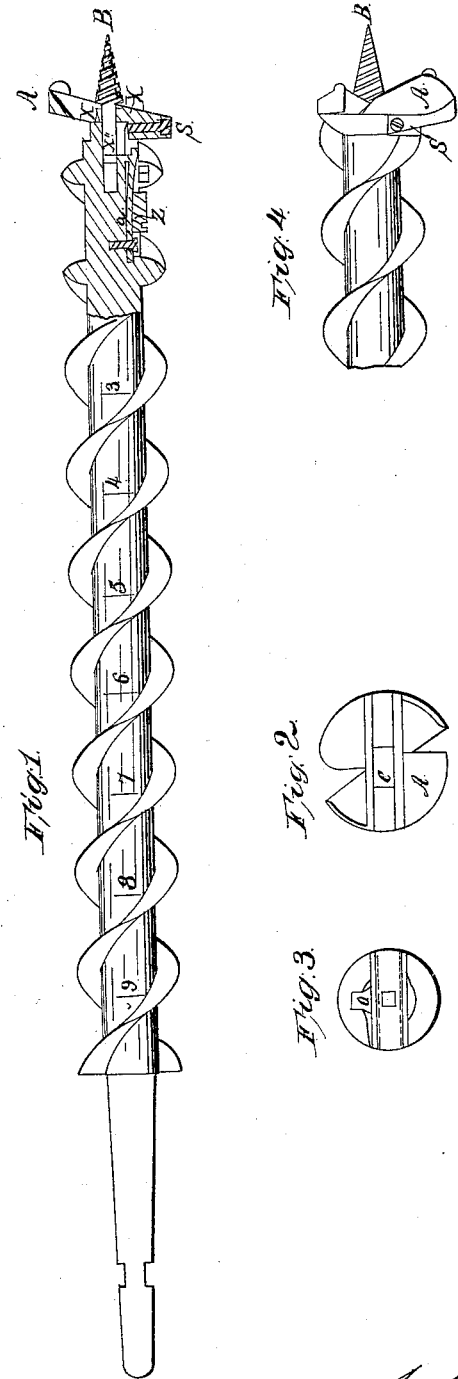

JOHN M. HATHAWAY, OF NEW YORK, N. Y.

AUGER.

Specification of Letters Patent No. 29,883, dated September 4, 1860.

*To all whom it may concern:*

Be it known that I, JOHN M. HATHAWAY, of the city, county, and State of New York, have invented certain new and useful Improvements in Augers with Expansible Cutters, &c., Sometimes Termed "Combination" Augers.

To explain the nature of my invention I will at once refer to the accompanying drawing constituting a part of this specification.

Figure 1 shows the form, &c., of my auger as a whole, (handle excepted,) the shaft &c., being an outside view, and a portion near the cutting end being divided in central longitudinal section and "broken off" to show in part the movability and method of attachment of the cutter disk A, and the center point or "worm" and the removable character of the said center point or screw, B.

The auger has a solid central shaft as seen which affords metal to form thereon at the extremity referred to, a "dove-tail" tenon, shown in cross section at Fig. 1, by $x$ $x$, but extending in length, at right angles to the section, across the whole diameter of the shaft portion of the auger. The object of this tenon is to hold the cutter disk A, from turning around with the auger whether adjusted concentric or eccentric to the auger shaft, while at the same time preventing its withdrawal therefrom when the auger is pulled from the hole which it may have bored. The cutter disk A, a plan view of the rear of which is shown by Fig. 2, having a corresponding "dove-tail" rabbet or groove to permit it to slide on the tenon before mentioned in a direction at right angles to the shaft of the auger. These cutters so arranged cannot be removed, for sharpening or otherwise, but by having the center worm B, removable. They are therefore made so, and held in place by a spring $a$, let into the body of the auger and carrying a branch or pin $x'$ which when the spring is pressed down parallel, or nearly so, to the bottom of the groove in which it lies, takes into a notch or gout in the tang $x''$, of the center screw thus holding the latter in place. To retain the fastening spring in that position there is a small block $z$, that slides along upon the back of the fastening spring in a dove-tail groove the form of which, and cross section of such block, is shown by the opening $o$, in Fig. 3, which is an end view of the auger with said block and the cutter Fig. 3 removed.

It will be understood that if the cutter be moved to an eccentric position by sliding on its dove-tailed tenon it will cut a larger hole than if set concentric with the auger shaft. Wherever set it is to be there held by turning in the screw $s$, which traverses the rear shoulder of one of its lips and pinches upon a flattened shoulder or face formed upon the end of the auger shaft and parallel to its tenon aforesaid.

Fig. 4, shows a portion of the auger with the cutter attached in a position at right angles to that of Fig. 1, and placed at its extreme eccentricity. The red lines opposite the shoulder of the cutter on Fig. 4, are to represent marks to be made on the said shoulder of the auger shaft at this point, by which to adjust the cutter to bore different sized holes. The cutter is there shown set to its greatest eccentricity, and by which it will bore its largest hole, and the marks being supposed to be $\frac{1}{32}$ of an inch apart, each next toward the center to which the corresponding shoulder of the cutter is moved, will cause it to bore a hole of $\frac{1}{16}$ of an inch less in diameter.

The aperture $e$, in the cutter, see Fig. 2, is elongated as shown to permit this sliding of the cutter while the center worm or screw remains in place.

It will be observed by inspection of the drawing that I make the feather or thread upon the shaft of the auger sharp at its edge, its object being that when the cutter is so adjusted as to cut a larger hole than would be filled by the exterior of such spiral feather there is a likelihood continually of chips or borings becoming wedged or impacted between the exterior edge and side of the hole causing resistance to the revolution of the auger;—but the edge of the feather being formed sharp, a wedging chip or shaving would be subdivided and its two or more parts travel on respectively above and below the given feather or spiral without causing further inconvenience.

For greater convenience in boring holes, to given desired depths I mark upon the shaft of the auger figures as seen which indicate the given number of inches to which it is entered. In the case of an auger without a central shaft this could not be conveniently done as will be readily comprehended.

Having now fully described my invention what I claim is—

1. The eccentrically adjustable cutter sliding on and held by the "dove-tail" groove and tenon as described.

2. In combination therewith giving a solid shaft or center to the auger thus affording solid and sufficient metal upon which to form said tenon.

3. Extending the spiral upon such solid shaft the entire length and making the edge of said spirals sharp for the reason given.

4. In combination making the center screw or worm removable as described for the reason given.

JOHN M. HATHAWAY.

Witnesses:
J. F. CASE,
W. G. NUTTING.